United States Patent [19]

Scherubel

[11] 4,237,974

[45] Dec. 9, 1980

[54] METHOD OF CONTROLLING FLUID LOSS IN ACIDIZING TREATMENT OF A SUBTERRANEAN FORMATION

[75] Inventor: Gary A. Scherubel, Tulsa, Okla.

[73] Assignee: The Dow Chemical Company, Midland, Mich.

[21] Appl. No.: 904,155

[22] Filed: May 9, 1978

[51] Int. Cl.$^3$ ............................................. E21B 33/13
[52] U.S. Cl. ................................ 166/281; 252/8.55 C; 166/307; 166/308
[58] Field of Search ................ 252/8.55 C, 8.55 R, 252/316; 166/273-275, 307, 308, 282, 259, 283, 281

[56] References Cited

U.S. PATENT DOCUMENTS

| | | | |
|---|---|---|---|
| 1,916,122 | 6/1933 | Grebe | 252/8.55 R |
| 2,122,483 | 7/1938 | Menual | 166/21 |
| 2,127,662 | 8/1938 | Grebe | 166/21 |
| 3,974,077 | 8/1976 | Free | 252/316 |
| 4,113,631 | 9/1978 | Thompson | 252/8.55 C |

*Primary Examiner*—Benjamin R. Padgett
*Assistant Examiner*—J. L. Barr
*Attorney, Agent, or Firm*—L. W. White; G. H. Korfhage

[57] ABSTRACT

Improved fluid loss control is realized in an acidizing treatment of a subterranean formation, of the type wherein a gelled pad fluid is injected ahead of an acidizing fluid, by dissolving an effective amount of an inorganic water soluble metal halide or sulfate salt in the pad fluid and injecting said salt containing pad fluid ahead of the acid.

23 Claims, No Drawings

METHOD OF CONTROLLING FLUID LOSS IN ACIDIZING TREATMENT OF A SUBTERRANEAN FORMATION

I. BACKGROUND OF THE INVENTION

A. Field of the Invention

The present invention relates to a method of stimulating a subterranean formation penetrated by a wellbore, particularly where a mineral acid is injected into the formation to dissolve a portion of the formation, especially as a part of a fracture acidizing treatment.

B. Description of the Prior Art

The problem of decreasing the permeability of certain portions of a subterranean formation so that certain treatments thereof with aqueous fluids can be made more efficient is well known in the art. For example, when acidizing a heterogenous permeable formation, it is important to contact the less permeable zones with the acid. Many additives, generally known as diverting agents, have been developed for this use. Also, when fracturing formations, more efficient treatments can be achieved if the fracturing fluid is not lost to the formation but instead can be further utilized to increase the length and width of the fractures.

Reasonably successful treatments have been performed, particularly at fracturing rates and pressures, wherein a gelled aqueous fluid is injected ahead of an acidizing fluid. However, such treatments have not been as successful as might have been desired, apparently because of high fluid loss. Laboratory studies suggest the acid forms wormholes through the more permeable parts of the formation. Thus, it is believed much of the acid is lost through the fracture walls rather than by penetration to the extremities of the fracture.

The fluid loss problem has been mitigated by utilizing fine particulate materials in the gelled pad fluid. However, the fine particulate has given rise to an unforseen problem. When some wells have been placed back on production, the fine particulate has tended to become entrained in the produced fluids, thereby causing undue wear on equipment, and the like. Thus, while larger size particles used as propping agents tend to stay in the fractures, the smaller size particles used as fluid loss agents apparently have greater mobility in the fracture.

The present invention provides fluid loss control without the need to include particulate material in either the pad or the acid.

As heretofore indicated, it has been known to employ a gelled pad ahead of acid. It had also been known to employ a salt containing fluid ahead of acid. See, for example, Grebe, U.S. Pat. No. 1,916,122; and Broaddus et al., U.S. Pat. No. 3,954,142, and related SPE Paper 5629. Broaddus et al. suggest at column 5, lines 18–38 that it may be desirable to employ viscous fluids of differing density for acid placement control by underriding or overriding of the various fluids. Graded rock salt has been employed as a particulate solid for fluid loss control, see SPE Paper 2751 and Howard et al., *Hydraulic Fracturing*, page 96 (1970), but not as a solute. There is no known suggestion to employ a dissolved salt in the pad fluid when fluid loss control is desired nor any recognition that salt dissolved in the pad improves fluid loss control.

II. SUMMARY OF THE INVENTION

The present invention is based on the discovery that by employing certain water soluble metal salts in the gelled pad fluid in an effective amount yet one which is not in excess of the amount necessary to saturate the gelled fluid, improved fluid loss control of the subsequently injected acidizing fluid can be obtained over that obtained under comparable conditions wherein the gelled fluid contains no such salt.

III. FURTHER DESCRIPTION OF THE INVENTION

Water soluble metal halides and sulfates are suitable for use herein. Such salts may be sufficiently soluble in the aqueous fluid to be gelled so that a sufficient quantity of the salt may be dissolved therein to provide improved fluid loss control to the acidizing fluid over that realized under comparable conditions where the gelled fluid contains no salt, as can readily be determined by routine laboratory procedures such as those hereinafter described under the caption "IV. Examples and Comparison Runs." Salts which form an insoluble precipitate in an acidic environment should be avoided to avoid plugging the formation during the acid injection step. Preferably employed herein is an alkali metal or alkaline earth metal halide or sulfate which meets the above mentioned solubility requirements. Compatible mixtures of salts may also be employed. Specific examples of suitable salts are sodium chloride, potassium chloride, calcium chloride, and sodium sulfate. Obviously, it will be recognized that such salts as calcium sulfate and its hydrates are only sparingly soluble in water and are therefore not suitable for use herein. Considering availability, safety, and the like, as well as performance, sodium chloride, potassium chloride, and calcium chloride are preferred, with sodium chloride being most preferred. Either anhydrous or hydrous salts may be employed, e.g. $CaCl_2$ (anh.) or $CaCl_2.2H_2O$.

As will become more apparent from review of test runs hereinafter set forth, the optimum amount of salt to employ is somewhat dependent on several factors such as formation permeability, quantity of gelling agent employed, the nature of the acidizing fluid, the presence of surfactants, and the like. For the most part, however, the data hereinafter set forth indicates satisfactory results can be achieved using at least the following amounts of salt, calculated on an anhydrous basis, depending on the formation permeability:

| Initial core permeability, md | Preferred Minimum salt concentration |
|---|---|
| less than 1.8 millidarcies | 1.5 lb/gal of gelled fluid |
| 1.8–4 md | 2 lb/gal |
| greater than 4 md | 3 lb/gal |

Preferably, sufficient salt is employed to substantially saturate the gelled fluid.

The thickening agents for the gelled aqueous liquid employable in the present invention include the natural, modified, and synthetic gums which are water soluble or dispersible and which do not precipitate in the presence of acid. Galactomannan gums and modified galactomannan gums are particularly useful as thickening agents in the present invention. A more detailed discussion of galactomannan gums suitable for use herein are described in Free, U.S. Pat. No. 3,974,077, at column 2, lines 18-49, the teachings of which are expressly incorporated herein. Also ideally suited for use herein are the various water soluble or dispersible cellulose derivatives which are considered modified gums, such as alkylcelluloses, carboxyalkylcelluloses, hydroxyalkylcelluloses, and alkylhydroxyalkylcelluloses. Specific examples include carboxymethyl-, methyl-, hydroxypropyl-, hydroxpropylmethyl-, hydroxyethyl-, ethylhydroxyethylcellulose, and the like. Synthetic water soluble or dispersible gums such as certain vinyl polymers (i.e. those which do not precipitate in acid) and ethylene oxide polymers may also be employed as the thickening agent.

If desired, the gel may be a crosslinked system such as that taught by Chrisp, U.S. Pat. Nos. 3,301,723; Kern, 3,058,909; Free, 3,974,077; Hoylmyer et al., 4,021,355; Tiner et al., 3,888,312; or the like. However, uncrosslinked gels have generally provided satisfactory for purposes of the present invention. Also, in employing a crosslinked gel, care should be taken to select combinations of gelling agents and crosslinkers which do not form insoluble precipitates in the presence of acid, and salts must be employed which do not interfere with the crosslinking mechanism or precipitate at the conditions of crosslinking.

When employing an uncrosslinked gel, the amount of thickening agent employed in the aqueous solution depends on the desired working viscosity of the solution. Aqueous solutions having viscosities ranging from about 20 to 100 centipoise (cps) or more are desirable as measured with the Fann model 35 viscometer at 100 rpm at the temperature to which the fluid will be exposed. The exact amount of thickening agent to be employed in any particular aqueous solution will depend on the particular thickening agent employed and its viscosity building characteristics, the temperature of the fluid, the formation permeability, the amount of time it is desired to have a maximum viscosity of the working temperature in the fluid and the like. Generally from about 20 to about 100 pounds of the thickening agent per 1000 gallons of aqueous solution is employed (about 2.4 to about 12 kg/m$^3$), preferably 40 lb-80 lb. These parameters can be easily ascertained for any particular system by performing simple laboratory experiments.

If desired, conventional breakers—e.g., enzymes, persulfates, enediol compounds such as ascorbic acid as disclosed in the commonly assigned copending application of Clark et al., Ser. No. 801,667 filed May 31, 1977—may also be employed in the pad fluid.

The acidizing fluid is one in which at least a portion of the formation is soluble, preferably a mineral acid such as hydrochloric, sulfuric, hydrofluoric, nitric, or a mixture thereof. Preferably hydrochloric acid is employed, e.g. at a concentration of from about 7 to about 30 percent by weight.

The acidizing fluid may be injected as an aqueous solution, as a foamed aqueous acid solution, or as an acid-in-oil emulsion. A conventional corrosion inhibitor is also customarily employed. Preferably, the acidizing fluid is injected as an aqueous solution or as a foam. Also, at least one of the gelled fluid or the acid preferably includes a foaming agent such as that taught in one of the allowed commonly assigned applications of James L. Thompson, each entitled "Foaming and Silt Suspending Agent," to wit Ser. No. 713,168 filed Aug. 10, 1976 (U.S. Pat. No. 4,113,631 issued Sept. 12, 1978) or even more preferably, Ser. No. 791,628 filed Apr. 27, 1977 (U.S. Pat. No. 4,108,782 issued Aug. 22, 1978). The teachings of said applications are expressly incorporated herein. In yet another embodiment, the aqueous acid solution may contain a foaming agent and be saturated with carbon dioxide. In the latter embodiment, slightly less salt appears to be required, although a saturated salt solution is still most preferred.

In carrying out the method of the present invention, the gelled pad and the acid are injected into the formation in sequence. Both fluids may be injected at a matrix rate if desired. However, the advantages of the present invention are most apparent when the invention is practiced in the context of a fracture acidizing treatment, i.e., where at least one of, and usually both, the gelled pad and the acid are injected at a rate sufficient to initiate or extend a fracture in the formation. In a fracture acidizing treatment, one or both of the fluids may contain a propping agent, although a propping agent is not normally necessary since the walls of the fracture are sufficiently etched by the acid to leave adequate conductivity through the fracture upon closure. If a propping agent is employed, it should have a particle size such that substantially all of the proppant will be retained on a 70 mesh screen, U.S. Sieve Series. Although such larger size particles may be used as a proppant, the fluids are preferably substantially free of smaller particulate solids since past experience has indicated the smaller particles become entrained in the produced fluids. Most desirably, however, both fluids are free of all solid particulate materials. Preferably, in either fracture acidizing or matrix acidizing treatments according to the present invention, the cycle of gelled pad fluid followed by acid is repeated at least once and preferably a plurality of times.

EXAMPLES AND COMPARISON RUNS

The following examples and comparison runs further illustrate the present invention and its advantages over the prior art.

The core tests were all carried out on 6-inch long limestone cores having a diameter of 1 inch. The cores were mounted vertically (except Test No. 35) in a Hassler sleeve apparatus, and treatment fluids were injected upward through the core at a back pressure of 1000 psi.

SERIES I—Liquid Fluid Loss

A series of tests was run wherein limestone cores were treated first with a pad fluid and thereafter with an aqueous solution of 15% HCl. Fluid constituents, initial core permeability, temperature, and milliliters of liquid lost from the core at various times are shown in Table I.

Previous experience indicates that where the pad contains no fluid loss control additive, such as a fine particulate or a salt according to the present invention, a blow out caused by wormholing of the acid through the entire length of the core would be expected under comparable test conditions within a minute or two after injection of the acid is begun. Tests 1, 2, and 4 demonstrate that fine particulate materials provide effective fluid loss control when employed in effective quantities (but compare Test 3 containing only 0.1 lb/gal particulate where a blow out was sustained after about a minute). Run 5 indicates fluid loss control can be achieved using excess NaCl as a particulate in the pad, but Runs 6-9 demonstrate that effective fluid loss control is obtained even without a particulate in the pad by employing a soluble salt in the pad.

TABLE I

Series I Tests
Test conditions: 6-inch long × 1-inch diameter limestone cores saturated with API brine.
Pressure = 1000 psi.

| Test No. | | Fluids | Initial permeability to API brine at room temperature, md. | Temp. | Fluid loss (ml) at time indicated (min) | | | | | |
|---|---|---|---|---|---|---|---|---|---|---|
| | | | | | 1 | 4 | 9 | 16 | 25 | 30 |
| 1 | Pad[1]: | 50 lb guar gum/1000 gal, 1 lb/gal 100–120 mesh[2] CaCO$_3$ | 1.0 | Room 75–80° F. (25° C.) | 0 | 0 | 0.5 | 1.4 | Not Read | 1.8 |
| | Acid: | 15% HCl with 0.4 volume percent Dowell A170S inhibitor | | | 0 | 0.2 | 0.4 | 1.0 | 1.2 | 1.3 |
| 2 | Pad: | 50 lb guar gum/1000 gal, 1 lb/gal 100–120 mesh CaCO$_3$ | 3.8 | Room | 0.0 | 1.0 | 2.0 | 2.8 | 3.5 | 3.8 |
| | Acid: | 15% HCl + 0.4% Dowell A170S inhibitor | | | 0.0 | 0.0 | 0.0 | 1 drop | 0.9 | 1.8 |
| 3 | Pad: | 50 lb guar gum/1000 gal, 0.1 lb gal 100–120 mesh CaCO$_3$ | 9.7 | Room | 1.8 | 2.9 | 3.8 | 4.5 | 5.2 | 5.6 |
| | Acid: | 15% HCl with 0.4 volume percent Dowell A170S inhibitor | | | 5 ml collected at blow out at 55 sec. | | | | | |
| 4 | Pad: | 75 lb guar gum/1000 gal, 0.25 lb/gal 100–120 mesh CaCO$_3$ 0.25 lb/gal fine sand[4] | 11.8 | Room | 1.6 | 2.3 | 3.1 | 3.8 | 4.3 Blow out at 24 min. | 4.4 |
| | Acid: | 15% HCl + 0.4% Dowell A170S inhibitor | | | 0.0 | 0.7 | 9.0 | 10.6 | | |
| 5 | Pad: | 75 lb guar gum/1000 gal, 1 lb excess NaCl/gal, in saturated NaCl brine | 3.2 | Room | 2.0 | 4.0 | 5.2 | 6.8 | 8.4 | 9.0 |
| | Acid: | 15% HCl with 0.4 volume percent Dowell A170S inhibiitor | | | 0.0 | 1.0 | 1.8 | 2.7 | 3.7 | 4.2 |
| 6 | Pad: | 75 lb guar gum/1000 gal, in saturated NaCl brine | 7.8 | Room | 1.6 | 3.0 | 3.9 | 4.7 | 5.2 | 5.4 |
| | Acid: | 15% HCl + 0.4% Dowell A170S inhibitor | | | 0.0 | 0.6 | 1.0 | 1.2 | 1.8 | 2.0 |
| 7 | Pad: | 75 lb guar gum/1000 gal in salt solution (18.5g NaCl/100 ml, or about 1.5 lb/gal) | 1.0 | Room | 0.2 | 1.6 | 2.4 | 3.2 | 3.8 | 4.0 |
| | Acid: | 15% HCl + 0.4% Dowell A170S inhibitor | | | 1 drop | 0.2 | 1.0 | 1.2 | 1.4 | 1.6 |
| 8 | Pad: | 75 guar gum/1000 gal in salt solution (as in Test 7) | 0.8 | 150° F. (65° C.) | 1 drop | 0.5 | 2.4 | 3.8 | 5.9 | 6.9 |
| | Acid: | 15% HCl + 0.4% Dowell A170S inhibitor | | | 1.0 | 4.9 | 7.0 | 9.3 | 12.4 | 14.0 |
| 9 | Pad: | 100 lb guar gum/1000 gal in 3 lb NaCl/gal salt solution | 0.7 | 200° F. (93° C.) | 0.0 | 0.1 | 1.5 | 6.0 | 10.9 | 13.2 |
| | Acid: | 15% HCl + 0.6% Dowell A170S inhibitor | | | 1.0 | 2.4 | 3.9 | 5.2 | 7.6 | 9.0 |

NOTES:
[1] In Test 1, Pad was preceded by 15% inhibited HCl for 30 seconds to simulate conventional formation breakdown step.
[2] All mesh U.S. Sieve Series.
[3] A Mannich reaction product type inhibitor of the type disclosed in U.S. Pat. No. 3,077,454 also containing acetylenic alcohols.
[4] 0–10% 10–70 mesh; 35–45% 70–100 mesh; 35–45% 100–140 mesh; 10–20% 140–200 mesh; 0–5% 200 mesh and finer.

SERIES II—CO$_2$ Fluid Loss

A second series of tests was carried out at a pressure of 1000 psi using as the acid, 28 weight percent HCl containing 0.4 volume percent Dowell A200 inhibitor (a Mannich reaction product inhibitor of the type disclosed in U.S. Pat. No. 3,077,454), and with the exception of Test 15, 1% by volume of the foaming and silt suspending surfactant blend described at page 32, line 2–17 and page 38, lines 1 and 2 of said allowed Ser. No. 791,628. In test 14 1% by volume of the surfactant blend was employed in the pad rather than in the acid. In each test in this series, the acid was saturated with CO$_2$ prior to contact with the core. The initial permeability of each of the cores to API brine was substantially equal, i.e. about 4–6 md. In each test, the pad fluid was injected into the cores for 30 minutes at an average rate of 5.17 ml/min (which corresponded to a dial setting of 2 on the Ruska pump employed).

Referring to Table II, Tests 10 and 11 show a comparison with no salt in the pad, both at 80° F. and 100° F. Test 12 shows 1 lb NaCl/gallon in the pad is effective. Test 13 shows 0.5 lb CaCl$_2$ provides some improvement, but tests 14 and 15 show much better results can be obtained with at least 1 lb salt per gallon of pad fluid.

TABLE II

Series II Tests

| Test No. | Fluids | | Temp. | CO$_2$ fluid loss expressed as liters of CO$_2$ at 1 atmosphere and as (ml CO$_2$ at 1000 psi) at time indicated (min) after injection of acid | | | | | | |
|---|---|---|---|---|---|---|---|---|---|---|
| | | | | 1 | 4 | 9 | 16 | 25 | 36 | 49 |
| 10 | Pad: | 40 lb HPG$^{(1)}$/1000 gal fresh water | 80° F. | 0 | 0.195 | Blow out at 7 min. 18 sec | | | | |
| | Acid: | CO$_2$ saturated inhibited 28% HCl w/surfactant | (~27° C.) | (0) | (2.78) | | | | | |
| 11 | Pad: | Same as Test 10 | 100° F. | 0.015 | | Blow out at 2 min. 55 sec. | | | | |
| | Acid: | Same as Test 10 | (~38° C.) | (0.21) | | | | | | |
| 12 | Pad: | 40 lb HPG/1000 gal + 1 lb NaCl/gal | 82° F. | 0 | 0.06 | 0.33 | 0.365 | 0.375 | 0.38 | 0.385 |
| | Acid: | Same as Test 10 | (~28° C.) | (0) | (0.86) | (4.71) | (5.21) | (5.36) | (5.43) | (5.5) |
| 13 | Pad: | 40 lb HPG/1000 gal + 0.5 lb CaCl$_2$ (anh.)/gal | 80° F. | 0.08 | 0.365 | 0.635 | 0.64 | Blow out at 23 min. 35 sec. | | |
| | Acid: | Same as Test 10 | (~27° C.) | (1.14) | (5.21) | (9.07) | (9.14) | | | |
| 14 | Pad: | 40 lb HPG/1000 gal + 1 lb CaCl$_2$ (anh.)/gal | 80° F. | 0 | 0.165 | 0.23 | 0.25 | 0.257 | 0.26 | 0.287 |
| | Acid: | Same as Test 10 | (~27° C.) | (0) | (2.36) | (3.28) | (3.57) | (3.67) | (3.71) | (4.1) |
| 15 | Pad: | 40 lb HPG/1000 gal + 2 lb CaCl$_2$ (anh.)/gal + 1 vol % surfactant | 76° F. | 0 | 0 | 0.01 | 0.225 | 0.39 | 0.4 | 0.405 |
| | Acid: | CO$_2$ saturated inhibited 28% HCl but w/o surfactant | (~24° F.) | (0) | (0) | (0.14) | (3.21) | (5.57) | (5.71) | (5.87) |

Notes:
$^{(1)}$Hydroxypropyl guar.

SERIES III—Effect of Salt on Viscosity

A series of tests was carried out at ambient temperature to determine whether or not the improved fluid loss observed when a salt is dissolved in the pad could be attributed merely to a thickening of the pad. Gels were prepared containing 75 lb guar gum per 1000 gallons of fresh water to which had been added various amounts of salts. Relative viscosities were determined on a Fann Model 35 viscometer at 100 rpm, 300 rpm, and 600 rpm. Results are shown in Table III, and demonstrate that any change in viscosity of the pad caused by the pressure of the salt is not so significant as to account for the significant improvement in fluid loss control realized by the practice of the invention.

TABLE III

Effect of Salt on Gel Viscosity

| | Viscometer dial reading (Note: Not centipoise) | | |
|---|---|---|---|
| Salt in Gel | 100 rpm | 300 rpm | 600 rpm |
| None-control | 72 | 106 | 134 |
| 1 lb NaCl/gal | 69 | 110 | 137 |
| 1 lb NaCl/gal + 0.1 lb CaCl$_2$/gal | 77 | 104 | 128 |
| 1 lb NaCl/gal + 0.2 lb CaCl$_2$/gal | 74 | 101 | 124 |
| 1 lb NaCl/gal + 0.3 lb CaCl$_2$/gal | 77 | 103 | 128 |
| 1 lb NaCl/gal + 0.5 lb CaCl$_2$/gal | 75 | 101 | 126 |
| 1 lb NaCl/gal + 1 lb CaCl$_2$/gal | 77 | 105 | 133 |
| 0.1 lb CaCl$_2$/gal | 86 | 109 | 133 |
| 0.5 lb CaCl$_2$/gal | 77 | 103 | 127 |
| 1 lb CaCl$_2$/gal | 75 | 100 | 123 |

SERIES IV—Additional Tests with Inhibited 15% HCl

In a manner such as that described in Series I, additional tests were carried out using pads containing guar gum or hydroxypropyl guar gum and various amounts of different salts. The acid employed was 15 percent HCl. Tests were carried out at ambient temperature, i.e. about 25° C. Results are shown in Table IV.

Runs 20, 21, 30, and 31 show substantially no benefit with only 1 lb salt/gal, although Runs 12–14 in Table II show some benefit at 0.5 and 1 lb of NaCl or CaCl$_2$ when the acid is saturated with an inert gas so that foam will be generated as the acid spends. Runs 7, 8, and 19 show beneficial results at a concentration of 1.5 lb/gal, but where the core permeability was 1.8 md or more, 1.5 lb/gal was only slightly effective (Runs 16, 7.5 md; Run 22, 1.9 md). Note that 2 lb/gal was effective at permeabilities of about 4 and less (Runs 23, 32, 35, and to some extent Runs 27 and 28). Based on the results of Runs 27 and 28, it is to be expected that better fluid loss would have been obtained in Run 33 by increasing the amount of gum or salt. Even though virtually no benefit was realized at 2 lb/gal in Runs 29 and 34 in Table IV where the permeability was about 5 md, good results were obtained on a core of about the same permeability in Run 15 of Table II where the acid also was saturated with CO$_2$ and a surfactant was used in the pad. Good fluid loss control was obtained in Runs 6 and 9 (Table I), and Runs 17, 18, and 26 using at least about 3 lbs per gallon, even on highly permeable cores. Runs 36–39 demonstrate that although salt in the pad is beneficial, salt in the acid itself is detrimental.

TABLE IV

Results of Series IV Tests

| Test No. | Pounds Polymer/ 1000 gal and Polymer$^1$ | Pounds salt/ gal and salt | Core Permeability, md. | Ml. Pad Fluid Loss in Min. | | | | | | Ml. Acid Fluid Loss in Min. | | | | | |
|---|---|---|---|---|---|---|---|---|---|---|---|---|---|---|---|
| | | | | 1 | 4 | 9 | 16 | 25 | 30 | 1 | 4 | 9 | 16 | 25 | 30 |
| 16 | 75# guar | 1.5 NaCl | 7.5 | 2.4 | 3.8 | 5.0 | 5.9 | 6.6 | — | 0.05 | 1.5 | Blow out 8 min 30 se | | | |
| 17 | 75# guar | 3 NaCl | 5.8 | 0.0 | 1.0 | 1.7 | 2.6 | 3.4 | — | 0.05 | 0.5 | 1.2 | 1.0 | 2.3 | — |
| 18 | 75# guar | 3 KCl | 1.2 | 0.05 | 1.3 | 3.0 | 4.4 | 6.0 | — | 0.0 | 0.1 | 1.2 | 2.0 | 2.8 | — |

TABLE IV-continued

Results of Series IV Tests

| Test No. | Pounds Polymer/ 1000 gal and Polymer[1] | Pounds salt/ gal and salt | Core Permeability, md. | Ml. Pad Fluid Loss in Min. 1 | 4 | 9 | 16 | 25 | 30 | Ml. Acid Fluid Loss in Min. 1 | 4 | 9 | 16 | 25 | 30 |
|---|---|---|---|---|---|---|---|---|---|---|---|---|---|---|---|
| 19 | 75# guar | 1.5 Na$_2$SO$_4$ | 0.81 | 0.0 | 0.9 | 1.2 | 1.4 | 1.6 | 1.8 | 0.0 | 0.0 | 0.2 | 0.9 | 1.0 | 1.05 |
| 20 | 75# guar | 0.5 CaCl$_2$ | 2.7 | 1.5 | 3.3 | 4.9 | 6.0 | 6.8 | 7.2 | 3.4 | | Blow out 1 min 8 sec. | | | |
| 21 | 75# guar | 1 CaCl$_2$ | 3.5 | 1.6 | 3.2 | 4.5 | 5.8 | 7.2 | 7.7 | 1.7 | | Blow out 1 min 53 sec. | | | |
| 22 | 75# guar | 1.5 CaCl$_2$ | 1.9 | 1.8 | 2.8 | 4.0 | 5.2 | 6.2 | 6.7 | 0.2 | 2.8 | Blow out 5 min 45 se | | | |
| 23 | 75# guar | 2 CaCl$_2$ | 1.9 | 1.0 | 1.2 | 1.3 | 1.7 | 2.0 | 2.1 | 0.0 | 0.05 | 0.1 | 0.5 | 1.0 | 1.0 |
| 24 | 75# guar | 2 CaCl$_2$ | 5.9 | 0.1 | 2.6 | 5.0 | 7.4 | 9.6 | 10.6 | 1.6 | | Blow out 1 min 55 sec | | | |
| 25 | 75# guar | 2 CaCl$_2$ | 9.3 | 2.4 | 4.0 | 5.0 | 8.0 | 9.9 | 10.4 | 1.4 | | Blow out in 1 min 42 sec | | | |
| 26 | 75# guar | 3 CaCl$_2$ | 1.3 | 0.1 | 1.6 | 2.8 | 3.6 | 4.6 | — | 1.0 | 1.2 | 1.6 | 1.8 | 2.2 | 2.4 |
| 27 | 75# HPG | 2 NaCl | 2.7 | 1.0 | 2.3 | 4.0 | 5.8 | 7.4 | 8.2 | 0.0 | 0.1 | 1.4 | 2.4 | Blow out 19 min. 37 sec | |
| 28 | 50# HPG | 2 NaCl | 2.4 | 1.7 | 3.5 | 5.6 | 7.9 | 10.5 | 11.6 | 0.0 | | Blow out 3 min 58 sec | | | |
| 29 | 40# HPG | 2 NaCl | 4.7 | 0.2 | 2.0 | 4.1 | 6.1 | 7.0 | 9.0 | 0.5 | | Blow out 2 min 45 sec | | | |
| 30 | 75# guar | 0.5 NaCl | 1.8 | 1.6 | 3.2 | 4.9 | 6.7 | 8.4 | 9.1 | | | Blow out at 48 sec. | | | |
| 31 | 75# guar | 1.0 NaCl | 1.8 | 1.2 | 4.5 | 6.4 | 9.6 | 11.4 | 12.1 | 3.4 | | Blow out 1 min 15 sec | | | |
| 32 | 75# guar | 2 NaCl | 4.0 | 1.6 | 3.2 | 4.8 | 5.8 | 6.8 | 7.2 | 0.05 | 1.0 | 1.1 | 1.5 | 1.8 | 2.1 |
| 33 | 50# guar | 2 NaCl | 2.1 | 1.6 | 2.6 | 3.1 | 5.1 | 6.3 | 6.8 | 2.2 | | Blow out 1 min 32 sec | | | |
| 34 | 40# guar | 2 NaCl | 5.0 | 0.2 | 2.6 | 5.5 | 8.4 | 11.6 | 13.2 | | | Blow out 47 sec | | | |
| 35[2] | 75# guar | 2 NaCl | 0.52 | 0.0 | 1.0 | 1.6 | 2.4 | 3.2 | 3.6 | 0.0 | 1.0 | | | | |
| 36[3] | 75# guar | 1.5 NaCl | 1.5 | 0.15 | 1.9 | 3.2 | 5.3 | 6.7 | — | 0.05 | | Blow out at 2 min 36 sec | | | |
| 37[4] | 75# guar | 2 NaCl | 1.1 | 0.05 | 1.2 | 1.4 | 1.7 | 1.8 | 3.2 | | Blow out at 1 min 15 sec | | | | |
| 38[4,5] | 75# guar | 2 sand | 0.74 | 0.0 | 1.8 | 3.0 | 4.3 | 5.4 | 5.7 | 0.0 | 0.05 | Blow out at 8 min 43 sec | | | |
| 39[5,6] | 75# guar | 2 sand | 1.3 | 0.1 | 2.2 | 3.8 | 5.4 | 7.0 | 7.6 | 0.0 | | Blow out at 2 min. | | | |
| 40 | 75# guar | 2 NH$_4$Cl | 0.8 | 0.2 | 0.9 | 1.6 | 2.4 | 3.4 | 3.8 | | | Blow out at 50 sec. | | | |
| 41 | 75# guar | 2 NaNO$_3$ | 0.6 | 0.5 | 0.9 | 1.3 | 1.8 | 2.3 | 2.5 | | 1.2 | Blow out 1 min 49 sec | | | |

[1]Guar = guar gum; HPG = hydxoypropyl gar.
[2]Test was run horizontally.
[3]Acid weighted to greater density than that of pad using 4 lb CaBr$_2$/gal acid.
[4]Acid weighted to same density as pad using 1.38 lb CaCl$_2$/gal acid.
[5]Fine sand described in Note 4 of Table I.
[6]Acid weighted to greater density than that of pad using 2.38 lb CaCl$_2$ acid.

SERIES V—Effect with Acid-in-Oil Emulsions

A fifth series of tests was carried out in a similar manner using an acid-in-oil emulsion as taught in Ser. No. 813,367 filed July 6, 1977 (now U.S. Pat. No. 4,140,640) comprising about 70 volume percent inhibited 15% HCl and about 30 volume percent kerosene and 0.5 percent surfactant blend. The surfactant comprised a mixture containing, by volume, 25% Armeen C brand cocoamine (90 weight percent active), 25% Witcamide 511 brand diethanolamide of oleic acid, and as a diluent, 6% glacial acetic acid and 44 percent isopropyl alcohol. All tests were carried out at 1000 psi. Results are shown in Table V. As is apparent, fluid loss is extremely difficult to control with such emulsions. Nevertheless, some benefit is realized using salt in the pad, at least where the initial core permeability is less than about 1.5.

TABLE V

RESULTS OF SERIES V TESTS

| Test No. | # Guar/ 1000 gal | Fluid-Loss Additive | Temp. °F. | Permeability in md | Ml. Pad Fluid Loss in Min. 1 | 4 | 9 | 16 | 25 | 30 | Ml. Acid Fluid Loss in Min. 1 | 4 | 9 | 16 | 25 | 30 |
|---|---|---|---|---|---|---|---|---|---|---|---|---|---|---|---|---|
| 42 | 75 | 2#/gal fine sand[(1)] | RT[(2)] | 1.2 | 0.3 | 0.9 | 4.1 | 6.2 | 8.0 | 8.6 | | | Blow out 1 min. | | | |
| 43 | 75 | 2#/gal NaCl | RT | 1.1 | 1.8 | 3.0 | 3.9 | 4.6 | 5.0 | 5.1 | 0.0 | 0.0 | 0.05 | 1.0 | 1.2 | 13. |
| 44 | 75 | 2#/gal NaCl | 150 | 0.96 | 0.2 | 1.0 | 4.4 | 17.0 | 20.0 | 20.3 | 1.2 | 5.7 | 13.9 | Blow out 11 min. 20 sec. | | |
| 45 | 75 | 2#/gal NaCl 2#/gal fine sand | 150 | 2.4 | 1.6 | 3.9 | 6.6 | 8.2 | 9.3 | 9.7 | 6.5 | | Blow out 1 min. 30 sec. | | | |
| 46 | 75 | 2#/gal NaCl 2#/gal fine sand | 150 | 0.72 | 0.5 | 7.2 | 17.5 | 27.5 | 38.0 | 41.5 | 1.0 | 4.3 | Blow out 8 min. 30 sec. | | | |
| 47 | 100 | 4#/gal NaCl | 150 | 3.0 | 0.9 | 3.5 | 5.5 | 8.0 | 11.4 | 13.0 | | | Blow out 42 sec. | | | |
| 48 | 75 | 2#/gal NaCl + 1% ethoxylated di-sec-butyl-phenol | 150 | 3.2 | 1.4 | 4.2 | 7.0 | 9.2 | 10.9 | 11.4 | 2.8 | | Blow out 1 min. 20 sec. | | | |
| 49 | 75 | 0.5#/gal NaCl | RT | 0.96 | 0.5 | 2.8 | 4.6 | 7.2 | 9.9 | 11.9 | 0.3 | | Blow out 3 min. 4 sec. | | | |
| 50 | 75 | 1.0#/gal NaCl | RT | 4.7 | 1.6 | 3.6 | 5.9 | 7.8 | 9.6 | 10.3 | | | Blow out 50 sec. | | | |
| 51 | 75 | 2.0#/gal NaCl | RT | 2.5 | 1.2 | 2.0 | 3.4 | 4.7 | 6.1 | 6.8 | | | Blow out 45 sec | | | |

Notes:
[(1)]See Note 4, Table 1
[(2)]Room Temperature, about 25° C.

What is claimed is:

1. In a method of treating a heterogenous permeable subterranean formation penetrated by a wellbore, wherein an acidizing fluid in which at least a portion of the formation is soluble is injected into the formation so that at least a portion of the formation is dissolved, the improvement which comprises: prior to injecting said acid, injecting an aqueous gelled fluid into the formation, said fluid containing dissolved therein, an inorganic water soluble metal halide or sulfate salt which does not precipitate in acid, in an amount effective to reduce the loss of the acidizing fluid to the more permeable portions of said formation, but not in excess of the amount necessary to saturate said gelled fluid.

2. The method of claim 1 wherein said salt is selected from those alkali metal and alkaline earth metal halides and sulfates which are soluble in said gelled fluid at least sufficiently so that said effective amount can be dissolved in said fluid.

3. The method of claim 2 wherein said salt is sodium chloride, calcium chloride, sodium sulfate, or potassium chloride, or a mixture thereof which does not react to form a precipitate.

4. The method of claim 3 wherein the salt is sodium chloride, potassium chloride, calcium chloride, or a mixture thereof.

5. The method of claim 4 wherein the salt is NaCl.

6. The method of claim 1 wherein the acid is an aqueous acid solution or a foamed aqueous acid solution.

7. The method of claim 6 wherein the acid is foamed.

8. The method of claim 6 wherein the acid is an aqueous hydrochloric acid solution containing a foaming agent and saturated with $CO_2$.

9. The method of claim 6 wherein at least the following quantities of salt, calculated on an anhydrous basis, are employed in the gelled fluid, per gallon of gelled fluid:

| Initial core permeability, md | Minimum salt concentration |
|---|---|
| less than 1.8 md | 1.5 lb/gal |
| 1.8 md–4 md | 2 lb/gal |
| greater than 4 md | 3 lb/gal |

10. The method of claim 9 wherein said salt is selected from those alkali metal and alkaline earth metal halides and sulfates which are soluble in said gelled fluid at least sufficiently so that said amount can be dissolved in said fluid.

11. The method of claim 10 wherein said salt is sodium chloride, potassium chloride, calcium chloride, sodium sulfate, or mixtures thereof which do not react to form a precipitate.

12. The method of claim 11 wherein sufficient salt is employed to substantially saturate the gelled fluid.

13. The method of claim 11 wherein at least one of the gelled fluid or the acid is injected at a rate and pressure sufficient to fracture said formation.

14. The method of claim 13 wherein the salt is NaCl, KCl, calcium chloride, or a mixture thereof.

15. The method of claim 14 wherein the salt is NaCl.

16. The method of claim 15 wherein sufficient salt is employed to substantially saturate the gelled fluid.

17. The method of claim 16 wherein at least one of the gelled fluid or the acid is injected at a rate and pressure sufficient to fracture said formation.

18. The method of claim 1 wherein the injection sequence of gelled pad fluid followed by an acidizing fluid is repeated at least once.

19. The method of claim 1 wherein the gelled pad fluid is substantially free of solids having a particle size of less than about 70 mesh, U.S. Sieve Series.

20. The method of claim 1 wherein the gelled pad fluid contains a propping agent, substantially all of said propping agent being retained on a 70 mesh screen, U.S. Sieve Series.

21. The method of claim 19 wherein the gelled pad fluid and the acidizing fluid are each substantially free of particulate solids.

22. The method of claim 1 wherein sufficient salt is employed to substantially saturate the gelled fluid.

23. The method of claim 1 wherein the acidizing fluid is an acid-in-oil emulsion and wherein the initial formation permeability is not in excess of about 1.5 millidarcies.

* * * * *

UNITED STATES PATENT AND TRADEMARK OFFICE
CERTIFICATE OF CORRECTION

PATENT NO. : 4,237,974
DATED : December 9, 1980
INVENTOR(S) : Gary A. Scherubel

It is certified that error appears in the above—identified patent and that said Letters Patent is hereby corrected as shown below:

Col. 2, line 44, after "employed," insert --the particular salt employed,--.

Col 3, line 18, delete "provided" and insert --proved--.

Cols. 5 & 6, Table I, Test 5, under Fluids heading, delete "inhibiitor" and insert --inhibitor--;

Test 7, under Fluids heading, delete "75-" and insert --75 lb--.

Cols. 7 & 8, Table II, Test 15, under Temp. heading, insert --)-- after "F."

Cols. 9 & 10, Table IV, under heading Ml. Acid Fluid Loss in Min., insert in subheading "1", --1.2-- and delete from subheading "4", "1.2".

*Signed and Sealed this*

*Fourteenth* Day of *April 1981*

[SEAL]

*Attest:*

RENE D. TEGTMEYER

*Attesting Officer*   *Acting Commissioner of Patents and Trademarks*